April 27, 1943.                J. FLETCHER                2,317,681
                              WELDING ELECTRODE
                            Filed Dec. 15, 1941

INVENTOR.
James Fletcher
BY Swan, Fryer & Hardesty
ATTY.

Patented Apr. 27, 1943

2,317,681

UNITED STATES PATENT OFFICE 2,317,681

WELDING ELECTRODE

James Fletcher, Detroit, Mich., assignor to Tipaloy, Incorporated, Detroit, Mich., a corporation of Michigan Application December 15, 1941, Serial No. 423,080

2 Claims. (Cl. 219—4)

The present invention relates to welding electrodes for such operations as spot and seam welding.

In spot and seam welding as practiced with the present known welding tips and wheels, the contact between the electrodes and the metal being welded is always made under considerable pressure.

Because of this pressure and the softening of the metal under heating, such welding always produces a slight depression in the surface of the material being welded. A pitted surface, such as is produced is frequently a drawback to subsequent finishing since the pits must be filled if a smooth finish is required.

Further, with the conventional electrode it is impossible to control the shape or size of the weld with an exactness that may under some conditions be of great importance.

Among the objects of the present invention is an electrode which will overcome these objections and others, and produce a weld free from pitting, be of substantially any desired shape, and be accurately sized.

With these and other objects in view, as will hereinafter appear to those skilled in the art, the invention consists broadly in providing an electrode with a flat contact surface having a portion of said surface of metal of high conductivity and the remainder of metal of lower conductivity, the preferred form being a centrally located area of metal of high conductivity surrounded by a rim of substantial width of metal of lower conductivity. the metal of high conductivity extending a substantial distance into the matrix of metal of lower conductivity.

In making use of the electrodes of the present invention, in a welding operation, the greater part of the current passing through the electrode travels through the portion of high conductivity metal, consequently all of the weld is produced under this part. At the same time, because of the fact that very little current flows through the adjacent metal of low conductivity, no welding takes place thereunder and the work metal does not soften.

Therefore, although the operation may take place under considerable pressure, no pitting will occur, since the pressure is supported by the unsoftened metal under the low conductivity part.

Electrodes embodying the invention may be made of several different combinations and such are contemplated.

Good results have been obtained using an inset of silver in a matrix of copper alloy and, while such a combination is preferred, it is also contemplated to make use of an inset of pure copper in a matrix of copper alloy of a substantially lower conductivity, but of sufficient hardness to protect the soft pure copper against mashing under the pressures used.

Further, since all of the welding takes place under the inset, other shapes than the circular one shown may be used to produce welds other than round. For example, square, rectangular, polygonal, annular or other shapes may be produced by correspondingly shaped insets if such welds are desired.

The drawing accompanying the present description illustrates embodiments of the invention in both spot and seam welding electrodes.

Figure 1:
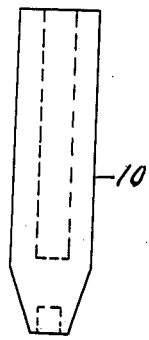
Figure 1 shows in elevation a tip embodying the present invention.
Figure 2:
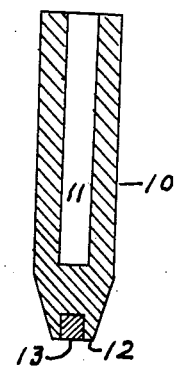
Fig. 2 is a central vertical section of the same.

As indicated above, and in the drawing, a welding tip embodying the invention may consist of a tip of low conductivity metal formed in any suitable process to produce a body portion 10 having an inner bore or cavity 11 and a flat contact surface 12 in which is fixed a plug 13 of the high conductivity metal, the exposed surface of which is flush with the surface 12 of the tip.

A suitable method of fixing the plug 13 in place is to provide the hole or socket of slightly smaller diameter than that of the plug and then shrink the plug by lowering its temperature to a point considerably below the temperature of the tip 10, then inserting the plug and allowing the temperature to rise.

Figure 3:
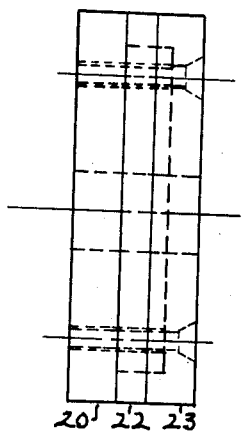
Fig. 3 is an edgewise elevational view of a seam welding wheel embodying the invention.
Figure 4:
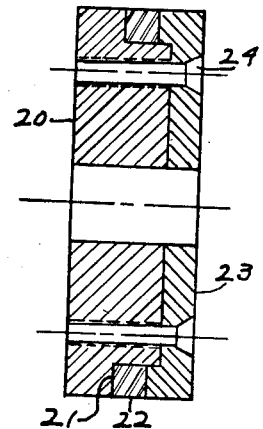
Fig. 4 is a central vertical section of the same.

Figures 3 and 4 show the invention embodied in a seaming wheel. In these figures the low conductivity metal body 20 of the wheel will be turned to provide a seat 21 for a ring 22 of metal of high conductivity which is then held in place by a suitable flanged plate 23 and screws or bolts 24.

The tread of the wheel will, of course, be finished with the body 20, the ring 22 and the edge of plate 23 flush.

In the case of the wheel and tip both, the low conductivity metal will furnish both lateral support for the softer high conductivity metal and means for taking the pressure reaction of the unsoftened metal.

It is to be understood that the invention may be embodied in other specific forms without departing from the spirit or scope thereof, and it is therefore desired that the present embodiments be considered in all respects as illustrative and not restrictive reference being had to the appended claims rather than to the foregoing description to indicate the scope of the invention.

I claim,

1. A spot-welding electrode consisting of a body portion of copper alloy having set in its welding contact face a plug of silver, said face and plug presenting a flat flush surface.

2. A spot welding electrode having a flat welding contact face consisting of a central area of silver surrounded by a rim of substantial width of copper alloy.

JAMES FLETCHER.